United States Patent
Yan et al.

(10) Patent No.: US 7,804,193 B2
(45) Date of Patent: Sep. 28, 2010

(54) ENERGY RECYCLE SYSTEM FOR USE WITH AC CURRENT POWER SUPPLY

(75) Inventors: Chao Yan, Shanghai (CN); Chongfeng Zheng, Shanghai (CN); Zhiqiang Zhan, Shanghai (CN); Jianhong Zeng, Shanghai (CN); Jianping Ying, Shanghai (CN)

(73) Assignee: Delta Electronics, Inc., Taoyuan Hsien (TW)

(*) Notice: Subject to any disclaimer, the term of this patent is extended or adjusted under 35 U.S.C. 154(b) by 433 days.

(21) Appl. No.: 11/837,646

(22) Filed: Aug. 13, 2007

(65) Prior Publication Data

US 2008/0238196 A1   Oct. 2, 2008

(30) Foreign Application Priority Data

Mar. 28, 2007   (TW) ............................... 96110900 A

(51) Int. Cl.
*H02J 1/12* (2006.01)
(52) U.S. Cl. .......................................... 307/45; 363/15
(58) Field of Classification Search .................. 307/45, 307/58, 82; 363/4, 15, 34, 108, 109; 60/750
See application file for complete search history.

(56) References Cited

U.S. PATENT DOCUMENTS

| | | | | | |
|---|---|---|---|---|---|
| 4,697,131 | A | * | 9/1987 | Schauder et al. | 318/762 |
| 4,731,723 | A | * | 3/1988 | Nogi et al. | 363/70 |
| 5,135,725 | A | * | 8/1992 | Hendrickson et al. | 422/186.15 |
| 5,847,948 | A | * | 12/1998 | Gatto et al. | 363/65 |
| 6,614,231 | B2 | | 9/2003 | Thrap | |
| 7,593,241 | B2 | * | 9/2009 | Kwon et al. | 363/16 |

FOREIGN PATENT DOCUMENTS

CN   2733370 Y   10/2005

\* cited by examiner

*Primary Examiner*—Albert W Paladini

(57) ABSTRACT

An energy recycle system for use with an AC current power supply, for example, an electronic ballast, is presented. The energy recycle system includes an energy recycle load connected to an output terminal of the AC current power supply, in which the energy recycle load includes a rectifier for rectifying the output AC current of the AC current power supply into a rectified DC current and a filter connected to the rectifier for removing the high-frequency harmonics from the rectified DC current. Also, the energy recycle system further includes a DC-AC converter connected to the energy recycle load for receiving the DC current outputted from the energy recycle load, which is in turn delivered to the utility grid to achieve energy recycling.

26 Claims, 12 Drawing Sheets

ENERGY RECYCLE SYSTEM FOR USE WITH AC CURRENT POWER SUPPLY

FIELD OF THE INVENTION

The present invention is related to an AC current power supply, and more particularly to an energy recycle system for use with an AC current power supply.

BACKGROUND OF THE INVENTION

Nowadays, more and more concern is focused on energy recycle for the sake of energy saving and environment protecting. Before a set of products are put on the market, they should experience lots of tests e.g. burn-in test so as to verify that the power parameters are within the specified tolerances with a minimal consumption of electric power by the power supply.

Generally speaking, a power supply has to undergo burn-in test for several hours to verify its reliability and stability. Conventional burn-in test system for power supply uses a resistor tank as the load. In this case, a large amount of energy is transformed into heat and dissipated thereby, which causes additional energy consumption dissipated by the air-conditioning system. In order to save energy consumption and reduce the cost of burn-in test, an energy recycle mechanism is usually provided in the burn-in test system in order to avoid the dissipation of the redundant energy. In recent years, the energy recycle technique used in burn-in test for DC power supply and uninterruptible power supply (UPS) has been extensively employed. FIG. 1 shows the circuitry of an energy recycle system used in a burn-in test system for DC power supply. As shown in FIG. 1, the energy recycle system 100 includes a boost converter 102 for drawing a load current from a DC power supply (not shown) and converting one or more output DC voltages of the DC power supply into an appropriate DC voltage, and a buck converter 104 for descending an output voltage of the boost converter 102 to a desired DC voltage. The energy recycle system 100 further includes a DC-AC converter 106 for converting an output DC voltage of the buck converter 104 into an AC voltage, and an output filter 108 for removing the high-frequency harmonics from the output AC current of the DC-AC converter 106. The output AC current of the output filter 108 is injected into the utility grid, thereby accomplishing the energy recycle operation. Because the boost converter 102, the buck converter 104 and the DC-AC converter 106 have high energy conversion efficiency, most of the energy can be delivered to the utility grid. As to the electronic ballast used for igniting gas discharge lamps such as fluorescent lamps, it also needs to undergo burn-in test. It is well known by those skilled in the art of power supply, the output of an electronic ballast is an AC current source having a frequency of 30 to 60 kHz. Therefore, an electronic ballast can be considered as an AC current power supply. In normal conditions, discharge lamps would show resistive characteristics. Therefore, electronic ballasts usually select power resistors as the load for burn-in test. Under this condition, a large amount of energy is converted into heat and dissipated thereby, which would cause additional energy waste in the air-conditioning system.

Therefore, an energy recycle system using with an AC current power supply for energy saving is proposed, so that the energy can be delivered to the utility grid with minimal power loss.

SUMMARY OF THE INVENTION

An object of the present invention is to provide an energy recycle system for use with an AC current power supply for recycling the energy outputted from the AC current power supply.

According to the conception of a first embodiment of the present invention, an energy recycle system for use with an AC current power supply is proposed. The AC current power supply includes an output terminal, and the energy recycle system includes an energy recycle load, which is connected to the output terminal of the AC current power supply for converting an output AC current of the AC current power supply into a DC current. The energy recycle system further includes an energy recycle converter circuit connected to the energy recycle load for receiving the DC current outputted from the energy recycle load.

According to the conception of a second embodiment of the present invention, an energy recycle system for use with an AC current power supply system is proposed. The AC current power supply system includes a plurality of parallel operated AC current power supplies. The energy recycle system includes a plurality of energy recycle loads, each of which is connected to an output terminal of an AC current power supply for converting an output AC current of the AC current power supply into a DC current. Furthermore, the energy recycle system includes an energy recycle converter circuit connected to the energy recycle loads for receiving the DC current outputted from the energy recycle loads.

Now the foregoing and other features and advantages of the present invention will be best understood through the following descriptions with reference to the accompanying drawings.

DETAILED DESCRIPTION OF THE PREFERRED EMBODIMENT

Several preferred embodiments embodying the features and advantages of the present invention will be expounded in following paragraphs of descriptions. It is to be realized that the present invention is allowed to have various modification in different respects, all of which are without departing from the scope of the present invention, and the description herein and the drawings are to be taken as illustrative in nature, but not to be taken as limitative.

Figure 1:
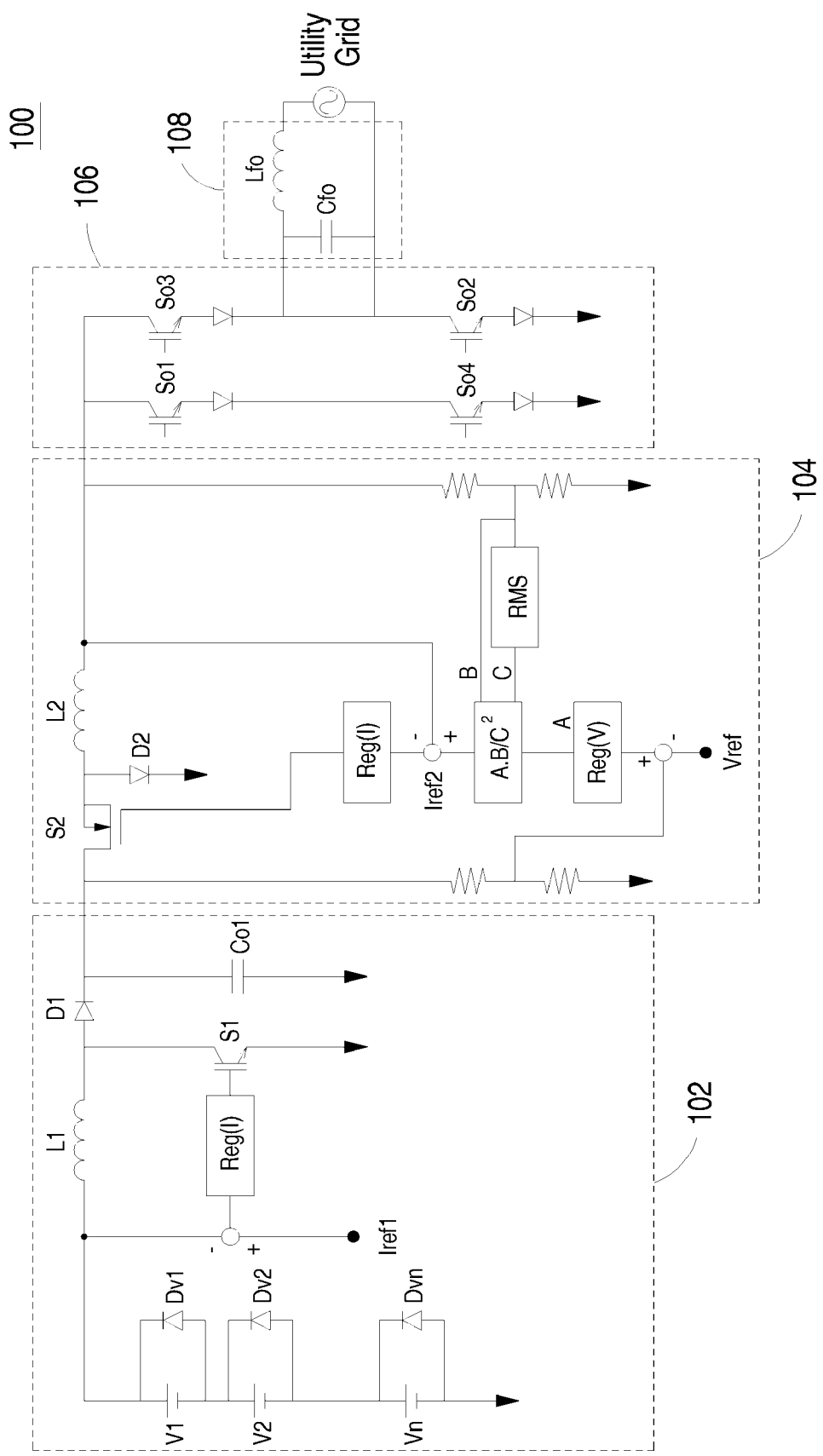
FIG. 1 is a circuit diagram showing an energy recycle system used in a burn-in test system of a DC power supply according to the prior art.
Figure 2:
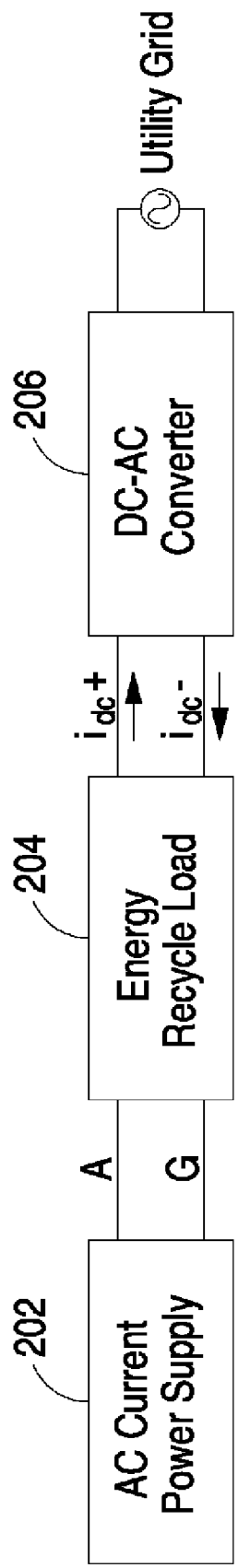
FIG. 2 is a generalized representation of an AC current power supply and an energy recycle system thereof according to a first embodiment of the present invention.

FIG. 2 shows a systematic block diagram of an AC current power supply and an energy recycle system thereof according to a first embodiment of the present invention. The AC current power supply 202 is configured to output an AC current, which is provided to an energy recycle load 204. The energy recycle load 204 is configured to draw an AC load current from the AC current power supply 202 and convert the AC current into a DC current $i_{dc}$. Besides, an energy recycle converter circuit such as a DC-AC converter 206 is connected in series with the energy recycle load 204 and configured to convert the output DC current $i_{dc}$ and the output DC voltage of the energy recycle load 204 into an AC current or an AC voltage, so as to deliver the energy back to the utility grid. The energy recycle converter circuit can be implemented by a variety of converter topologies, such as a series circuit consisted of a buck converter 104 and a DC-AC converter of FIG. 1. Certainly, the energy recycle converter circuit can also be implemented by a different converter topology, such as a DC-DC converter which uses a battery as the load of the energy recycle load 204 thus the energy can be transferred back to the battery for saving.

Figure 3:
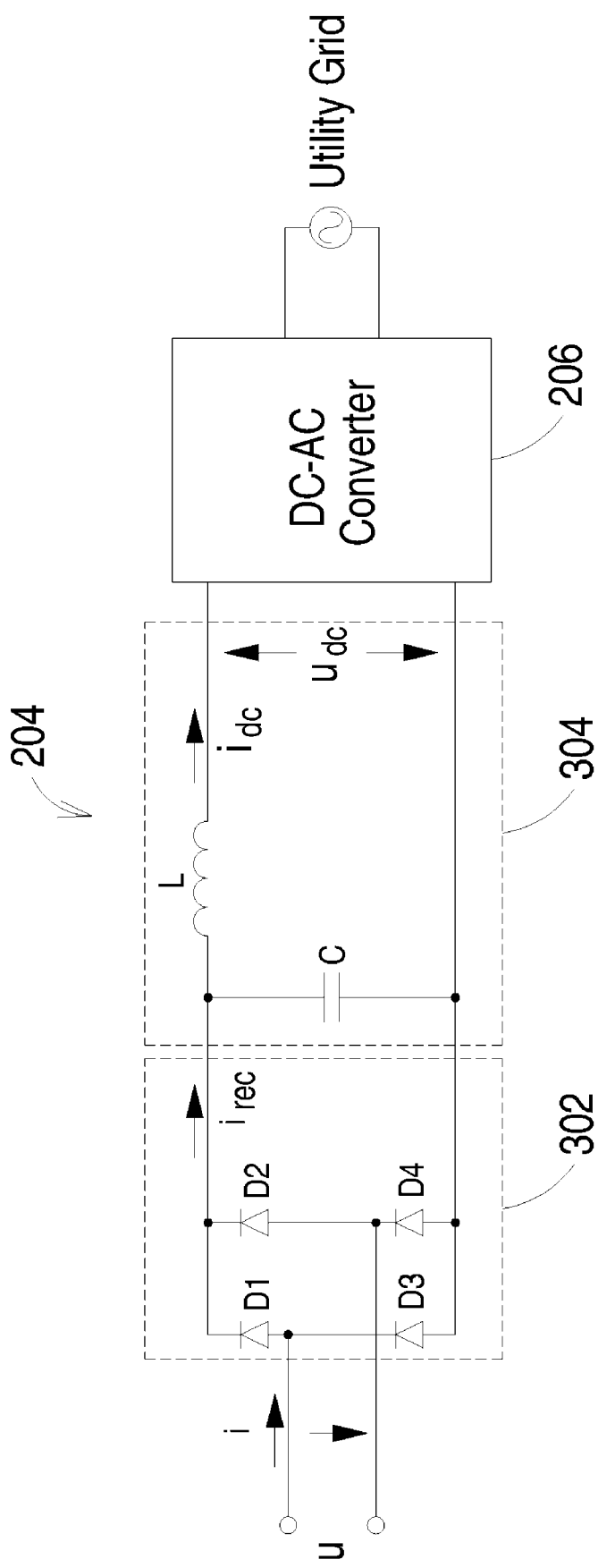
FIG. 3 is a circuit diagram showing an energy recycle load of FIG. 2.

FIG. 3 shows the circuit architecture of the energy recycle load 204 of FIG. 2, in which the energy recycle load 204 can show a resistive characteristic at the fundamental frequency of the AC current i. As shown in FIG. 3, the energy recycle load 204 includes a rectifier 302 comprised, for example, a bridge circuit made up of uncontrolled rectifier diodes D1, D2, D3, D4. The rectifier 302 is configured to rectify the AC current i into a rectified DC current $i_{rec}$. Besides, the energy recycle load 204 further includes a filter 304 comprising a filtering capacitor C, in which the filtering capacitor C is connected in parallel with the rectifier 302. Alternatively, the filter 304 is consisted of a filtering capacitor C and a filtering inductor L, in which the filtering capacitor C is connected in parallel with the rectifier 302 and the filtering inductor L is connected in series with the rectifier 302. The filter 304 is configured to remove the high-frequency harmonics of the rectified DC current $i_{rec}$ outputted from the rectifier 302 to obtain a DC current $i_{dc}$.

Figure 4:
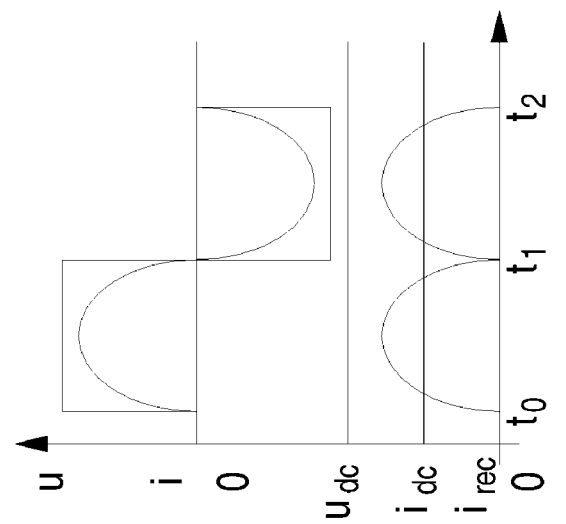
FIG. 4 is a timing diagram showing the voltage waveform and the current waveform measured within the energy recycle load of FIG. 3.

FIG. 4 shows the waveforms of the internal voltages and currents of the energy recycle load 302 of FIG. 3. As shown in FIG. 4, u is the output AC voltage of the AC current power supply 202, i is the output AC current of the AC current power supply 202, $u_{dc}$ is the output DC voltage of the filter 304, $i_{dc}$ is the output DC current of the filter 304, and $i_{rec}$ is the output current of the rectifier 302. Assuming that the waveform of the output AC current i of the AC current power supply 202 is an ideal sinusoidal wave and the capacitance of the filtering capacitor C is sufficiently large, the waveform of the output AC voltage u of the AC current power supply 202 will be a square wave. As shown in FIG. 4, $i_{rec}$ is the output current of the rectifier 302 and is a rectified sinusoidal-wave current having numerous harmonics. The filter 304 is configured to remove the harmonics of the output current $i_{rec}$ of the rectifier 302. In the present embodiment, the capacitance of the filtering capacitor C is set so as to have a low impedance for high-frequency harmonics, and the inductance of the filtering inductor L is set so as to have a low impedance for low-frequency harmonics. Therefore, the DC component of the output current $i_{rec}$ of the rectifier 302 will flow through the filtering inductor L.

Figure 5:
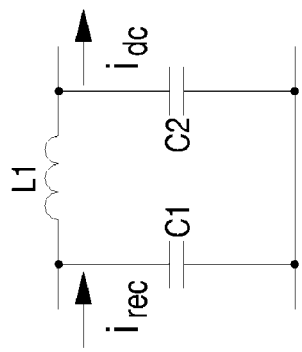
FIG. 5 shows another example of the circuit topology of the filter as part of the energy recycle load.

FIG. 5 illustrates another example of the topology of the filter 304. As shown in FIG. 5, the filter includes a first filtering capacitor C1 and a LC filtering network connected in parallel with the first filtering capacitor C1. The first filtering capacitor C1 is connected in parallel with the rectifier 302 shown in FIG. 3, and the LC filtering network includes a first filtering inductor L1 connected in series with the rectifier 302 shown in FIG. 3 and a second filtering capacitor C2 connected in parallel with the first filtering capacitor C1, thereby improving the filtering effect of the filter 304.

Figure 6:
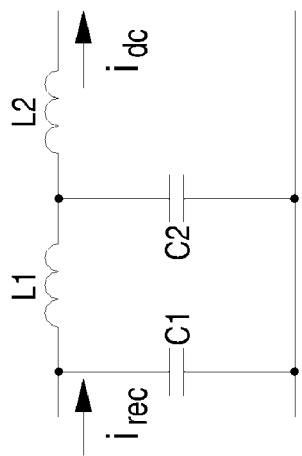
FIG. 6 shows another example of the circuit topology of the filter as part of the energy recycle load.

FIG. 6 illustrates another example of the topology of the filter 304. As shown in FIG. 6, the filter includes a first filtering capacitor C1 connected in parallel with the rectifier 302 shown in FIG. 3, a first filtering inductor L1 connected in series with the rectifier 302, and a second filtering capacitor C2 connected in parallel with the first filtering capacitor C1, wherein the first filtering inductor L1 and the second filtering capacitor C2 form a LC filtering network. In addition, the filter further includes a second filtering inductor L2 connected in series with the first filtering inductor L1, thereby increasing the order of the filter 304 and achieving a better filtering effect.

Figure 7:
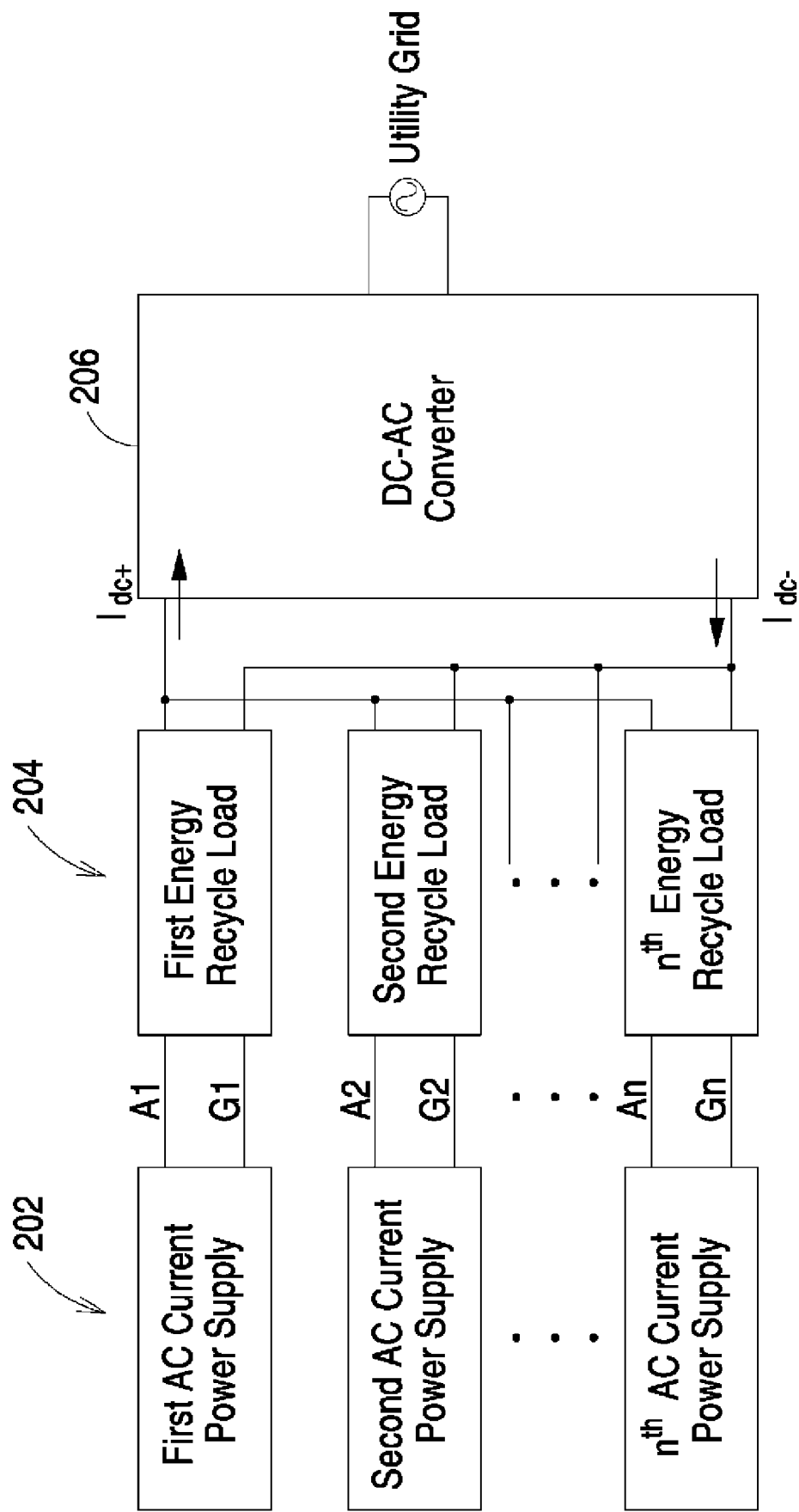
FIG. 7 is a systematic block diagram of the energy recycle system being extensively applied to a parallel operation AC current power supply system according to a second preferred embodiment of the present invention.

FIG. 7 illustrates the example where the energy recycle system is extensively applied to a parallel operation AC current power supply system according to a second embodiment of the present invention. As shown in FIG. 7, a plurality of AC current power supplies 202 are parallel operated with each other and each AC current power supply is connected in series with an energy recycle load. The energy recycle loads 204 are configured to convert the output AC current of the AC current power supply system 202 into a DC current, and the energy of the DC current is delivered to the utility grid through the DC-AC converter 206. The output terminals of the energy recycle loads 204 are connected in parallel with each other and together connected to the DC-AC converter 206.

Figure 8:
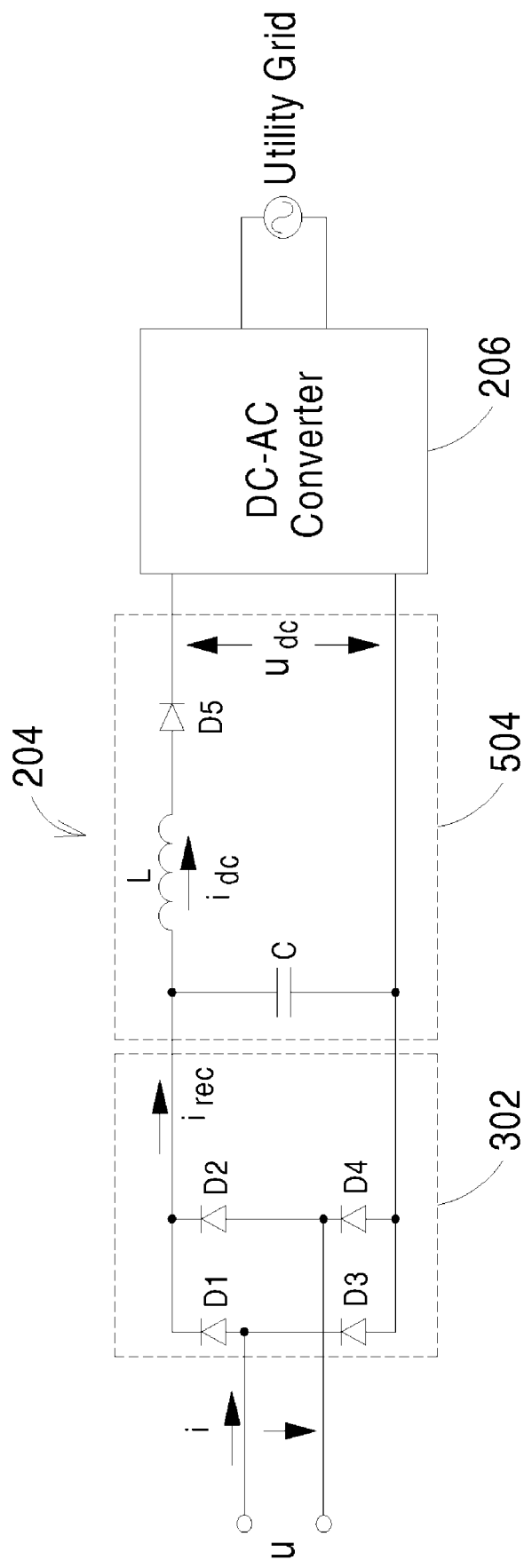
FIG. 8 is a circuit diagram showing a modified circuitry of the energy recycle load.

FIG. 8 illustrates a modified circuit configuration of the energy recycle load. Compared with FIG. 3, the filter 504 of the energy recycle load 204 of FIG. 8 includes a reverse current protection device connected between the filtering inductor L and the DC-AC converter 206. In the present embodiment, the reverse current protection device is made up of a diode D5 for protecting the energy recycle load 204 form being damaged by a reverse current flowing from the DC-AC converter 206 to the energy recycle load 204. Alternatively, the reverse current protection device can be made up of a transistor. In this case, the energy recycle load 204 further includes a transistor control unit (not shown) for manipulating the switching operation of the reverse current protection device.

Figure 9:
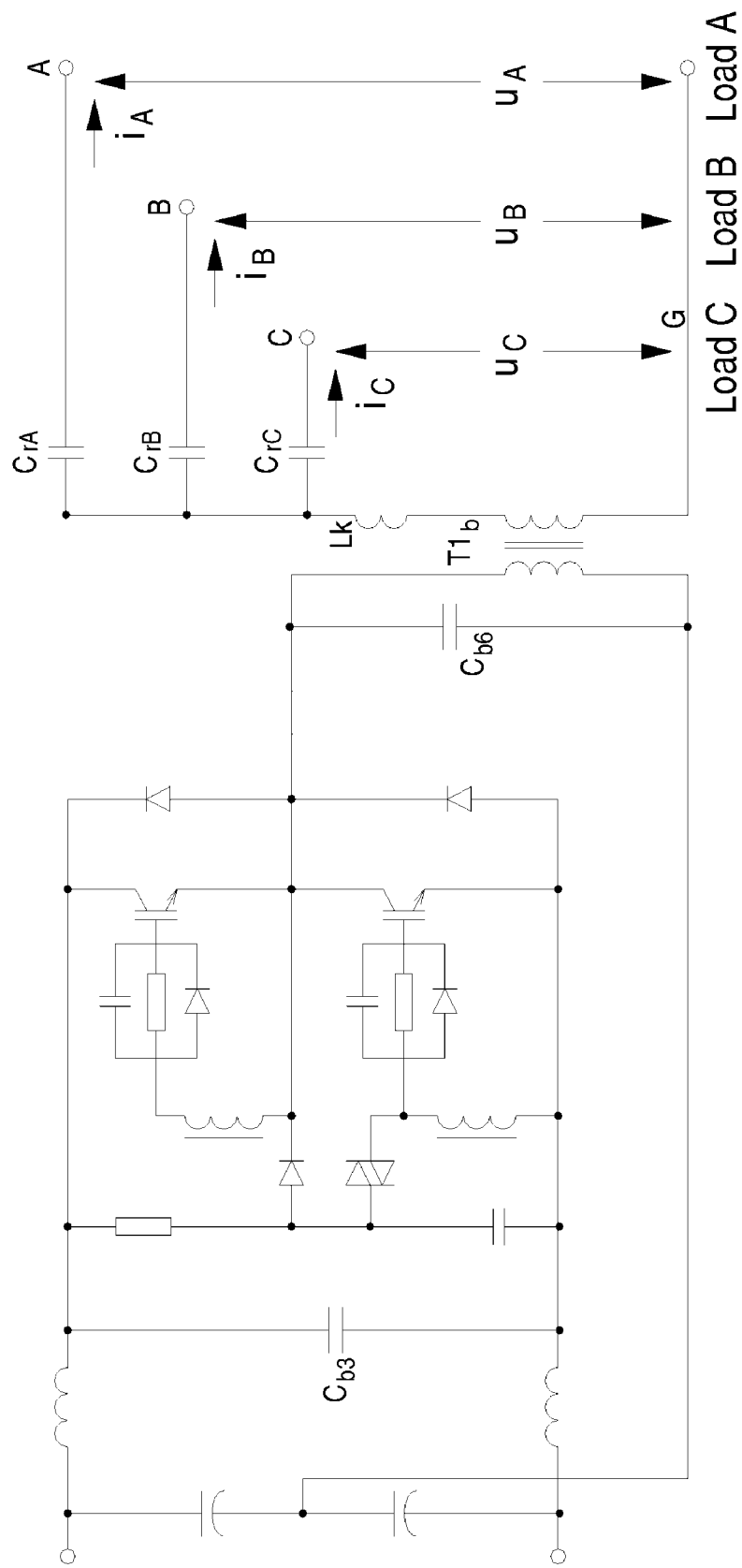
FIG. 9 shows the DC/AC part of an electronic ballast.

FIG. 9 shows the DC/AC part of an electronic ballast, wherein the electronic ballast further comprises a PFC circuit. As shown in FIG. 9, the DC/AC part of the electronic ballast is a multi-lamp ballast converter using a parallel resonance circuit, in which the load is also part of the resonance circuit. In FIG. 9, Lk is the leakage inductance of the transformer $T1_b$, $Cr_A$, $Cr_B$, $Cr_C$ are output capacitors, and $C_{b3}$ and $C_{b6}$ are resonance capacitors. Nodes A, B and C are the output nodes of the electronic ballast, and can be connected to load A, load B and load C, respectively, in which these loads can be fluorescent lamps. In conventional applications, the load A, load B and load C are power resistors on the premise of burn-in test. In the present invention, the load A, load B and load C can be implemented by the energy recycle load 204 of FIG. 3 or the energy recycle load 204 of FIG. 8, in which the performance of the energy recycle load is analogous with power resistors so as to draw load currents from the electronic ballast.

Figure 10:
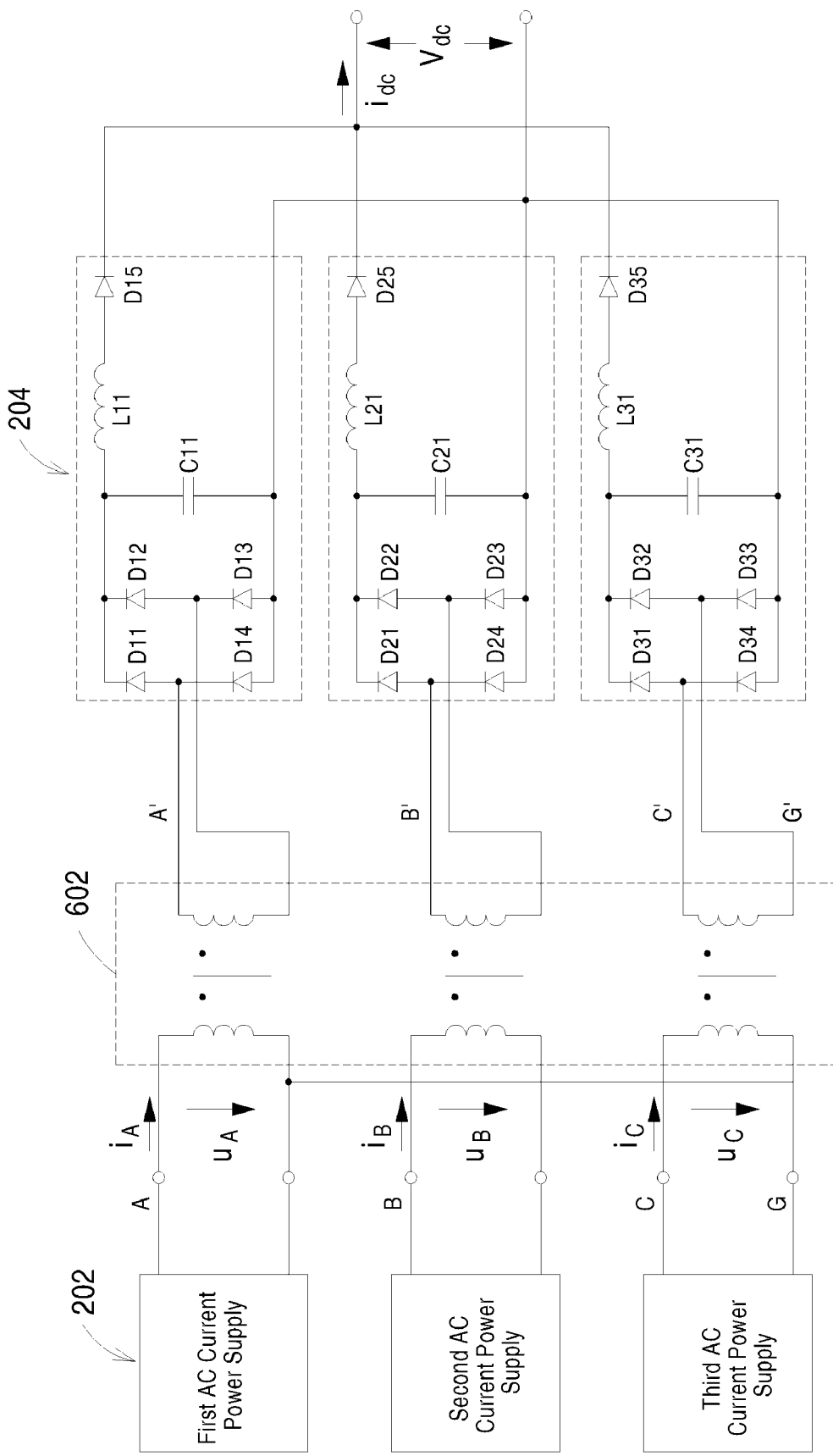
FIG. 10 is a circuit diagram showing the circuitry of the energy recycle system of FIG. 7.

FIG. 10 is the circuit diagram of the energy recycle system of FIG. 7. It should be noted that each AC current power supply 202 and energy recycle load 204 includes an isolated transformer 602 mounted therebetween for separating the AC current power supply 202 and the energy recycle load 204. In FIG. 10, the circuit configuration of the energy recycle load 204 is the same with the circuit configuration of the energy recycle load of FIG. 8.

Figure 11:
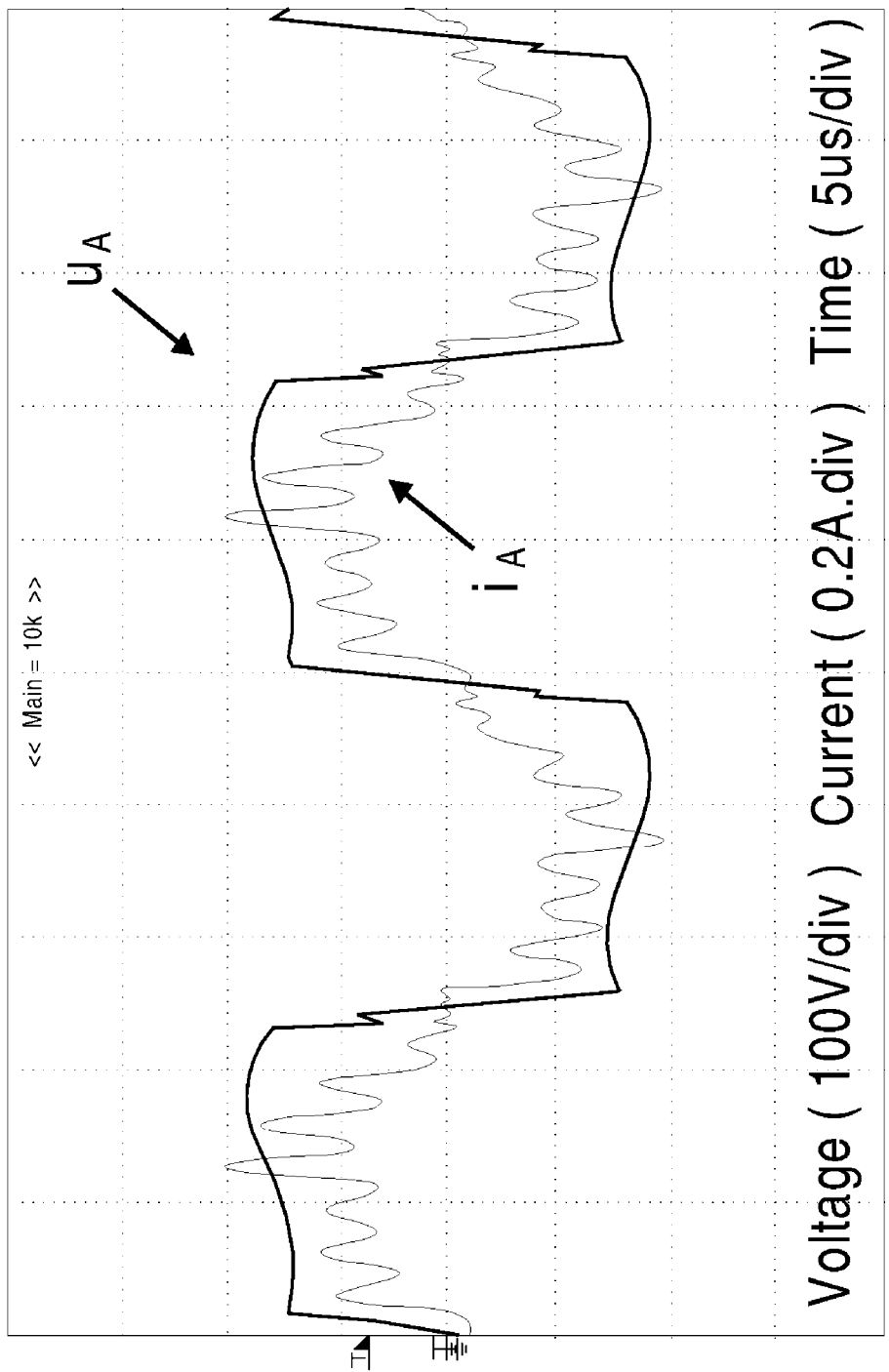
FIG. 11 shows the experimental results in association with the energy recycle system according to the present invention.

FIG. 11 shows the experimental results in association with the energy recycle system according to the present invention, in which $u_A$ and $i_A$ denotes the output voltage and the output current of the AC current power supply of FIG. 10. It can be seen from FIG. 11 that the phase difference between the voltage $u_A$ and the current $i_A$ is approximately zero. Therefore, the function of the energy recycle load of the present invention is analogous with a power resistor. However, the output current $i_A$ has some high-frequency harmonics because of the parasitic resonance of the AC current power supply.

Figures 12, 13:
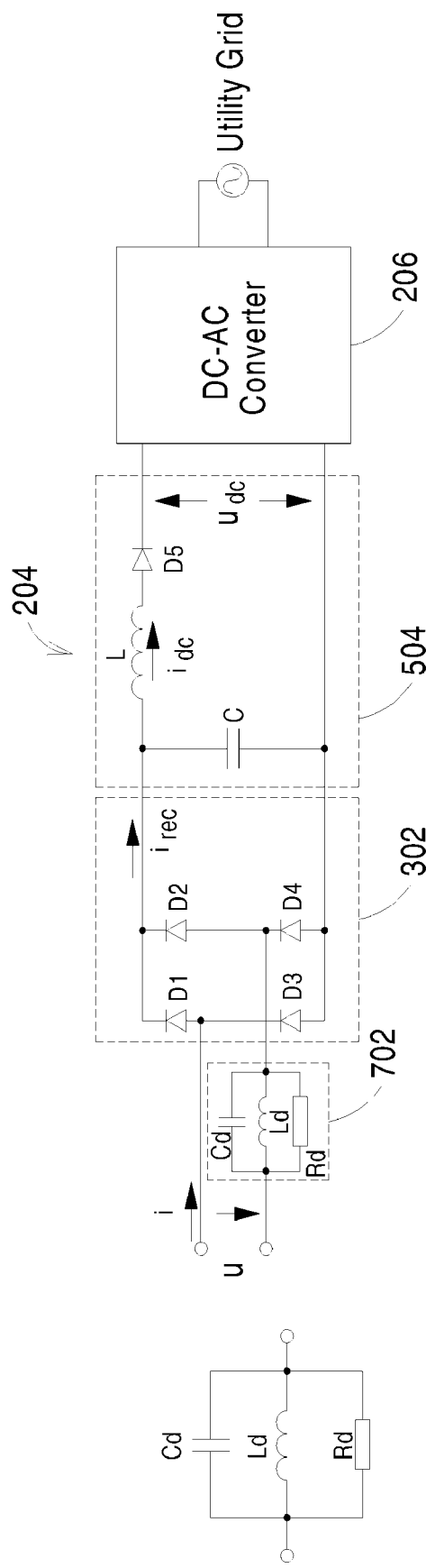
FIG. 12 shows the structure of a damper.
FIG. 13 is a circuit diagram of the energy recycle system with the energy recycle load incorporating a damper.

In order to smooth the waveform of the output AC current i of the AC current power supply, a damper is necessary to be incorporated into the energy recycle load. FIG. 12 shows the structure of a damper that has a high impedance at the resonant frequency of the output AC current i and has a low impendence at other frequencies. As shown in FIG. 12, the damper includes an inductor Ld, a capacitor Cd and a resistor Rd, all of which are connected in parallel with each other. The inductance of inductor Ld and the capacitance of capacitor Cd enables the damper to have a high impedance at the resonant frequency for suppressing resonance, and to have a low impedance at other frequencies so that the operation of the AC current power supply will not be affected. In addition, the incorporation of the resistor Rd enables the damper to show a high-impedance characteristic over a certain range of frequency. Therefore, the characteristics of the damper are highlighted by a wide impedance band and a low power loss. In order to obtain a wide impedance band, the resonant frequency of the resonant inductor Ld and the resonant capacitor Cd is set to be approximate to the frequency of the harmonics. As to the inductance of the inductor Ld and the capacitance of the capacitor Cd, it can be calculated by the following equation:

$$f = \frac{1}{2\pi\sqrt{LdCd}}$$

Where f is the frequency approximate to the frequency of harmonics. Besides, if it is desired to suppress all the harmonic resonance, the resistance of the resistor Rd has to be sufficiently large. However, if it is desired to reduce the power loss of the damper, the resistance of the resistor Rd has to be small. Hence, when designing the damper, the selection of the resistance of resistor Rd has to make a trade-off in order to meet the design requirements. In addition to the structure depicted by FIG. 12, other kinds of dampers having different structure also can be used. For example, a resistor can be connected in series with the capacitor Cd to form a capacitive branch, which is then connected in parallel with the inductor Ld and the resistor Rd. Alternatively, a resistor can be connected in series with the inductor Ld to form an inductive branch, which is then connected in parallel with the capacitor Cd and the resistor Rd. Alternatively, a resistor can be connected in series with the capacitor Cd to form a capacitive branch and a resistor can be connected in series with the inductor Ld to form an inductive branch, and the inductive branch and the capacitive branch are connected in parallel.

FIG. 13 shows the circuitry of an energy recycle system incorporating a damper for energy recycle load thereof. The circuitry of FIG. 13 is similar to that of FIG. 8, except that a damper 702 is placed in series with the AC current power supply (not shown) e.g. the damper 702 is placed between the energy recycle load 204 and the AC current power supply and it can also be placed between the rectifier 302 and the filter 504, thereby suppressing the high-frequency harmonics of the output AC current i of the AC current power supply.

Figure 14:
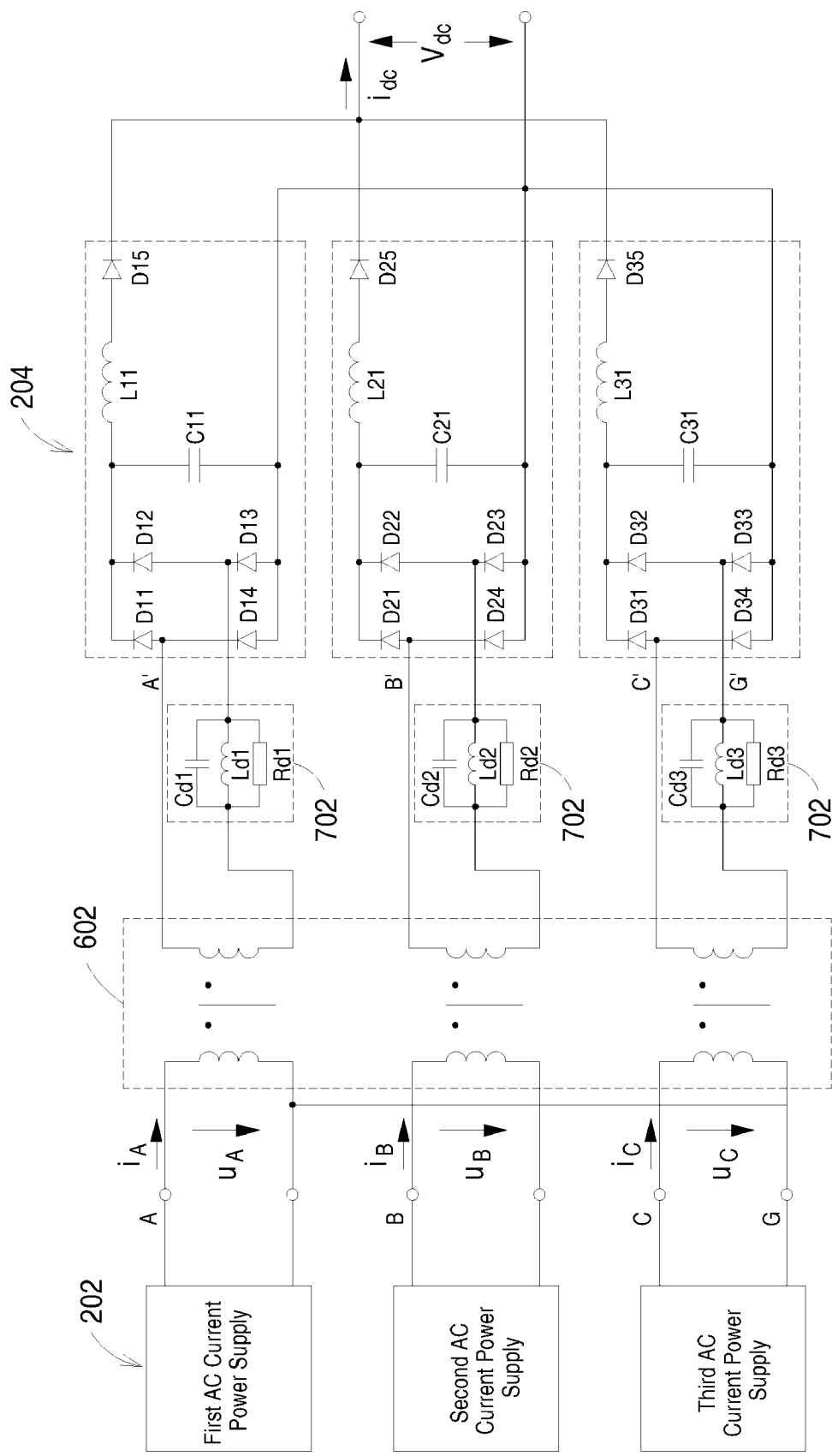
FIG. 14 is a circuit diagram showing an energy recycle system being extensively applied to a parallel operation AC current power supply system with the energy recycle load incorporating a damper.

FIG. 14 shows the circuitry of an energy recycle system being extensively applied to a parallel operated AC current power supply system, in which each energy recycle load incorporates a damper. The circuitry of FIG. 14 is similar to that of FIG. 10, except that a plurality of dampers are respectively placed in series with each AC current power supply 202. Therefore, the high-frequency harmonics of the output AC current $i_A$, $i_B$, $i_C$ of the AC current power supply can be suppressed.

Figure 15:
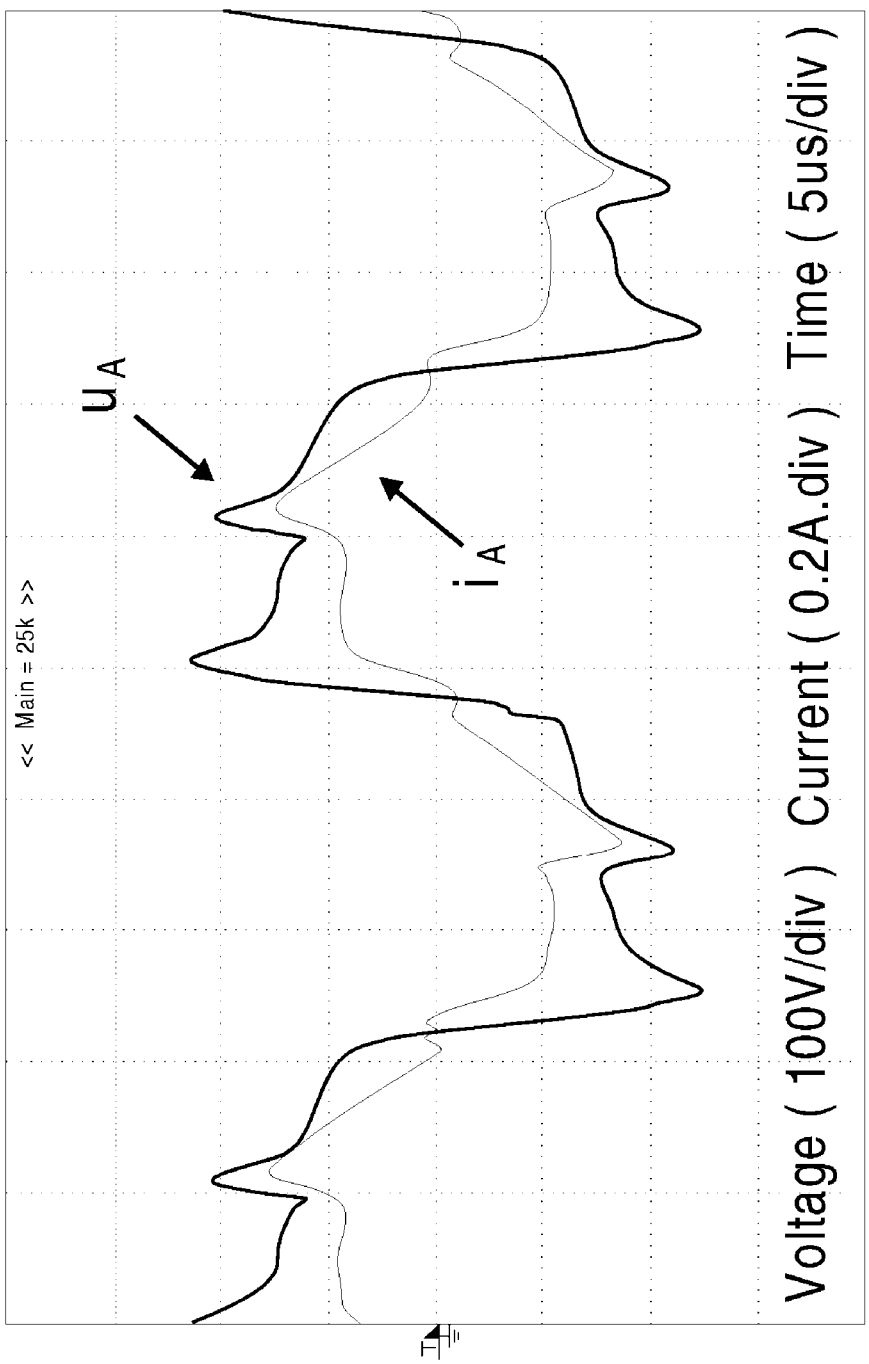
FIG. 15 shows the experimental results in association with the energy recycle system according to the present invention.

FIG. 15 is a compilation showing the experimental results of the energy recycle system according to the present invention, in which $u_A$ and $i_A$ respectively denote the output voltage and the output current of the AC current power supply of FIG. 14. It can be understood from this diagram that the phase difference between the output voltage $u_A$ and the output current $i_A$ is still approximate to zero. However, with the incorporation of the damper placed in series with the AC current power supply, most of the harmonic components of the output current $i_A$ have been removed.

In sum, the present invention proposes an energy recycle system for use with an AC current power supply, in which the energy recycle system includes an energy recycle load having a rectifier and a filter and a DC-AC converter. The rectifier of the energy recycle load is configured to convert the output AC current of the AC current power supply into a rectified DC current, and the filter of the energy recycle load is configured to remove the high-frequency harmonics from the rectified DC current. By appropriately selecting the capacitance of the filtering capacitance of the filter and selecting the inductance of the filtering inductor of the filter, the energy recycle load is able to show a resistive characteristic at the fundamental frequency of the output AC current i of the AC current power supply. Therefore, the energy recycle load can draw a load current from the output terminal of the AC current power supply and deliver most of the energy to the utility grid through the DC-AC converter so as to accomplish the energy recycling operation.

Those of skilled in the art will recognize that these and other modifications can be made within the spirit and scope of the present invention as further defined in the appended claims.

What is claimed is:

1. An energy recycle system connected to a utility grid for use with an AC current power supply, wherein the AC current power supply includes an output terminal, the energy recycle system comprising:
   a load for energy recycle, which is connected to the output terminal of the AC current power supply for converting an output AC current of the AC current power supply into a DC current; and
   a converter circuit for energy recycle connected to the load for receiving the DC current outputted from the load and recycling energy to the utility grid.

2. The energy recycle system according to claim 1 wherein the converter circuit is a DC-AC converter connected to the load for converting the DC current outputted from the load into an AC voltage or an AC current.

3. The energy recycle system according to claim 2 wherein the AC current power supply is an electronic ballast.

4. The energy recycle system according to claim 2 wherein the load includes a rectifier connected to the output terminal of the AC current power supply for rectifying the output AC current of the AC current power supply into a rectified DC current, and a filter connected to an output terminal of the rectifier for removing high-frequency harmonics from the rectified DC current outputted from the rectifier.

5. The energy recycle system according to claim 4 wherein the rectifier is a bridge rectifier.

6. The energy recycle system according to claim 4 wherein the filter comprises:
   a filtering capacitor connected in parallel with the rectifier.

7. The energy recycle system according to claim 6 wherein the filter further includes:
   a filtering inductor connected in series with the rectifier.

8. The energy recycle system according to claim 6 wherein the filter further includes:
   at least one inductor-capacitor filtering network connected in parallel with the filtering capacitor, wherein the inductor-capacitor filtering network includes a first filtering inductor and a second filtering capacitor.

9. The energy recycle system according to claim 8 wherein the filter further includes a second filtering inductor connected in series with the inductor-capacitor filtering network.

10. The energy recycle system according to claim 4 wherein the load further includes a reverse current protection device connected between the filter and the converter circuit for preventing a reverse current from flowing from the converter circuit to the load.

11. The energy recycle system according to claim 10 wherein the reverse current protection device includes a diode.

12. The energy recycle system according to claim 1 further comprising a damper, which is connected in series with the AC current power supply for suppressing harmonics of the output AC current of the AC current power supply.

13. The energy recycle system according to claim 12 wherein the damper includes an inductor branch, a capacitor branch and a resistor connected in parallel with each other.

14. The energy recycle system according to claim 13 wherein the inductive branch includes an inductor and the capacitive branch includes a capacitor.

15. An energy recycle system connected to a utility grid for use with an AC current power supply system, wherein the AC current power supply system includes a plurality of parallel operated AC current power supplies, the energy recycle system comprising:
   a plurality of loads for energy recycle, each of which is connected to an output terminal of an AC current power supply for converting an output AC current of the AC current power supply; and
   a converter circuit for energy recycle connected to the plurality of loads for receiving a DC current from the plurality of loads and recycling energy to the utility grid.

16. The energy recycle system according to claim 15 wherein the AC current power supply is an electronic ballast.

17. The energy recycle system according to claim 15 wherein the converter circuit is a DC-AC converter connected to the plurality of loads for converting the DC current outputted from the plurality of loads into an AC voltage or an AC current.

18. The energy recycle system according to claim 17 wherein each load includes a rectifier connected to an output terminal of an AC current power supply for rectifying an output AC current of the AC current power supply into a rectified DC current, and a filter connected to an output terminal of the rectifier for removing high-frequency harmonics from the rectified DC current.

19. The energy recycle system according to claim 18 wherein the rectifier is a bridge rectifier.

20. The energy recycle system according to claim 18 wherein the filter comprises:
   a filtering capacitor connected in parallel with the rectifier; and
   a filtering inductor connected in series with the rectifier.

21. The energy recycle system according to claim 18 wherein the filter comprises:
   a first filtering capacitor connected in parallel with the rectifier; and
   at least one inductor-capacitor filtering network connected in parallel with the first filtering capacitor, wherein the inductor-capacitor filtering network comprises a first filtering inductor and a second filtering capacitor.

22. The energy recycle system according to claim 18 wherein the load further includes a reverse current protection device connected to the filter and the converter circuit for preventing a reverse current from flowing from the converter circuit to the load.

23. The energy recycle load according to claim 22 wherein the reverse current protection device comprises a diode.

24. The energy recycle system according to claim 15 further comprising a plurality of dampers, each of which is connected in series with the AC current power supply for suppressing harmonics of the output AC current of the AC current power supply.

25. The energy recycle system according to claim 24 wherein each damper comprises an inductive branch, a capacitive branch and a resistor connected in parallel with each other.

26. The energy recycle system according to claim 25 wherein the inductive branch comprises an inductor and the capacitive branch comprises a capacitor.

* * * * *